(12) United States Patent
Shah

(10) Patent No.: US 6,967,226 B2
(45) Date of Patent: Nov. 22, 2005

(54) REACTIVE HOT-MELT ADHESIVE COMPOSITIONS WITH IMPROVED ADHESION TO DIFFICULT SUBSTRATES

(75) Inventor: Pankaj Shah, Crystal Lake, IL (US)

(73) Assignee: Rohm and Haas Company, Philadelphia, PA (US)

( * ) Notice: Subject to any disclaimer, the term of this patent is extended or adjusted under 35 U.S.C. 154(b) by 113 days.

(21) Appl. No.: 10/650,428

(22) Filed: Aug. 28, 2003

(65) Prior Publication Data

US 2004/0071977 A1 Apr. 15, 2004

Related U.S. Application Data

(60) Provisional application No. 60/407,740, filed on Sep. 3, 2002.

(51) Int. Cl.$^7$ ................................................. C08J 3/00
(52) U.S. Cl. .................. 524/590; 524/588; 428/423.1; 525/455; 528/28
(58) Field of Search ............................... 524/590, 588; 428/423.1; 525/455; 528/28

(56) References Cited

U.S. PATENT DOCUMENTS

| | | |
|---|---|---|
| 3,391,077 A | 7/1968 | Osborne |
| 4,775,719 A | 10/1988 | Markevka et al. |
| 5,061,749 A | 10/1991 | Ito et al. |
| 5,804,253 A | 9/1998 | Hagiwara et al. |
| 5,916,964 A * | 6/1999 | Fromwiller ............. 524/590 |
| 5,994,474 A | 11/1999 | Wey et al. |
| 6,280,561 B1 | 8/2001 | McInnis et al. |
| 6,303,731 B1 | 10/2001 | Carlson et al. |
| 6,350,799 B1 | 2/2002 | Wang |
| 6,355,317 B1 | 3/2002 | Reid et al. |
| 6,365,700 B1 | 4/2002 | Graham |

FOREIGN PATENT DOCUMENTS

| | | |
|---|---|---|
| EP | 0 827 994 | 3/1998 |
| WO | WO 98/58003 | 12/1998 |
| WO | WO 0172922 | 10/2001 |

* cited by examiner

*Primary Examiner*—Robert D. Harlan
(74) *Attorney, Agent, or Firm*—Carl P. Hemeasway

(57) ABSTRACT

A moisture-reactive hot-melt composition, useful as an adhesive, is provided that has improved balance of ultimate strength and adhesion to difficult substrates. In particular, the composition is made from a polyol, a polyisocyanate, and a functional polymer. Also provided are a method for making such compositions, a method for using such compositions for bonding substrates, and composite articles bonded with such compositions.

6 Claims, No Drawings

REACTIVE HOT-MELT ADHESIVE COMPOSITIONS WITH IMPROVED ADHESION TO DIFFICULT SUBSTRATES

CROSS-REFERENCE TO RELATED APPLICATIONS

This is a Non-Provisional U.S. Patent Application of U.S. Provisional Patent Application No. 60/407,740, filed Sep. 3, 2002.

BACKGROUND

This invention relates to moisture-reactive hot-melt compositions useful as adhesives, to a method for making such compositions, to a method for bonding substrates with such compositions, and to bonded composite articles made by such a method for bonding.

Some moisture-reactive hot-melt compositions are useful as reactive hot-melt adhesives. Some desirable properties of such adhesives are suitable cure times; high ultimate strength (i.e., high strength after the curing reaction is effectively completed); good adhesion to polyolefins and other substrates to which adhesion is often difficult; and high ultimate strength at elevated temperature (also called "heat resistance"). Some useful reactive hot-melt adhesives are known that contain polyurethane polymers and/or prepolymers.

Hot melt polyurethane compositions may be formulated by the addition of a variety of thermoplastic polymers. With effective choices of thermoplastic polymers, such formulations sometimes have good adhesion to polyolefin substrates, but such formulations are known in the art to lack heat resistance and to require undesirably long times for the curing reaction between the adhesive and moisture to reach completion. U.S. Pat. No. 6,355,317 discloses the use of silicon-containing atmospheric curing resins and the use of isocyanate-functional moisture-curing resins. Many atmospheric curing resins based solely on silicon-type curing reactions are known in the art to require undesirably long cure times. The object of the present invention is the provision of moisture-curable hot melt compositions that reach a useful level of adhesive strength in a usefully short time, that adhere well to polyolefin and other substrates to which it is difficult to adhere, and that reach desirably high levels of heat resistance.

STATEMENT OF THE INVENTION

In a first aspect of the present invention, there is provided a moisture-reactive hot-melt composition formed by admixing components comprising at least one polyol, at least one polyisocyanate, and at least one silane-functional polyolefin.

In a second aspect of the present invention, there is provided a method of making a moisture-reactive hot-melt composition comprising admixing components comprising at least one polyol, at least one polyisocyanate, and at least one silane-functional polyolefin.

In a third aspect of the present invention, there is provided a method for bonding substrates comprising (a) making a moisture-reactive hot-melt composition comprising admixing components comprising at least one polyol, at least one polyisocyanate, and at least one silane-functional polyolefin;

(b) heating said hot-melt composition;

(c) applying said heated hot-melt composition to a first substrate;

(d) contacting said applied heated hot-melt composition with a second substrate; and (e) cooling, or allowing to cool, said hot-melt composition.

In a fourth aspect of the present invention, there is provided a bonded composite article comprising at least two substrates bonded by a moisture-reactive hot-melt composition formed by admixing components comprising at least one polyol, at least one polyisocyanate, and at least one silane-functional polyolefin; wherein said silane-functional polyolefin comprises at least one silane-functional poly-α-olefin; wherein said silane-functional polyolefin has 20% or less crystallinity; and wherein said polyol comprises at least one polyester polyol and at least one polyether polyol.

DETAILED DESCRIPTION

The composition of this invention is a moisture-reactive hot-melt composition useful as an adhesive. By "moisture-reactive" is meant herein that the composition contains reactive groups which are capable of reacting with water desirably to effect an increase in the molecular weight of the composition and/or effect crosslinking of the composition so as to increase the strength properties of the composition subsequent to being contacted with water. By "hot-melt" is meant herein that the composition which may be a solid, semi-solid, or viscous mass can be advantageously heated to provide a fluid adhesive of a viscosity suitable for application to and adhesion to substrates. By "Mn" and "Mw" are meant herein number-average molecular weight and weight-average molecular weight, respectively, both measured by gel permeation chromatography.

The moisture-reactive hot-melt composition of the present invention is formed by admixing components which include at least one polyisocyanate, i.e., an isocyanate bearing at least two isocyanate groups. Polyisocyanates which may be used include for example aromatic polyisocyanates, aliphatic polyisocyanates, cycloaliphatic polyisocyanates, and mixtures thereof. Suitable polyisocyanates include, for example, m-phenylene diisocyanate, 2,4-toluene diisocyanate, 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate (also called 4,4'-MDI), 2,4-diphenylmethane diisocyanate (also called 2,4'-MDI), 4,4'-biphenylene diisocyanate, 3,3'-dimethoxy-4,4'-biphenyl diisocyanate, 3,3'-dimethyl-4,4-biphenyl diisocyanate, 3,3'-dimethyl-4,4'-diphenylmethane diisocyanate, isophorone diisocyanate, 4,4',4"-triphenylmethane triisocyanate, polymethylene polyphenylene polyisocyanate, 2,4,6-toluene triisocyanate, 4,4'-dimethyl-diphenylmethane tetraisocyanate, prepolymers having a Mn less than 2000 and bearing at least two isocyanate groups, and mixtures thereof. Preferred are 2,4' MDI, 4,4' MDI, and mixtures thereof. When mixtures of 2,4' MDI and 4,4' MDI are used, a preferred amount of 2,4' MDI is 0.5% or more by weight based on the weight of all polyisocyanates; more preferred is 2% or more; still more preferred is 25% or more; still more preferred yet is 40% or more; most preferred is 45% or more. When mixtures of 2,4' MDI and 4,4' MDI are used, also preferred are amounts of 2,4' MDI that are 90% or less by weight based on the weight of all polyisocyanates; more preferred is 80% or less; still more preferred is 70% or less; still more preferred yet is 60% or less; most preferred is 55% or less.

The moisture-reactive hot-melt composition of the present invention is formed by admixing components which include at least one polyol. A polyol is a compound with two or more hydroxyl functional groups. Suitable polyols include a wide variety of compounds, some of which are described in *Polyurethane Handbook*, 2$^{nd}$ edition, edited by G. Oertel, Hanser Publishers, 1994. In addition to the hydroxyl functions, suitable polyols may contain other functionality, such as for example carbonyl, carboxyl, anhydride, unsaturation, or other functional groups. Suitable polyols include, for example, polyether polyols, polyester polyols, polyetherester polyols (sometimes called polyether ester polyols and/or polyester ether polyols), fatty polyols, and mixtures thereof. Suitable polyol(s) may be independently selected from crystalline, semi-crystalline, or amorphous polyols.

Polyester polyols suitable for use in the present invention include those formed from diacids, or their monoester, diester, or anhydride counterparts, and diols. The diacids may be saturated $C_4$–$C_{12}$ aliphatic acids, including branched, unbranched, or cyclic materials, and/or $C_8$–$C_{15}$ aromatic acids. Examples of suitable aliphatic acids include, for example, succinic, glutaric, adipic, pimelic, suberic, azelaic, sebacic, 1,12-dodecanedioic, 1,4-cyclohexanedicarboxylic, and 2-methylpentanedioic acids. Examples of suitable aromatic acids include, for example, terephthalic, isophthalic, phthalic, 4,4'-benzophenone dicarboxylic, 4,4'-diphenylamide dicarboxylic acids, and mixtures thereof. The diols may be $C_2$–$C_{12}$ branched, unbranched, or cyclic aliphatic diols. Examples of suitable diols include, for example, ethylene glycol, 1,3-propylene glycol, 1,2-propylene glycol, 1,4-butandediol, neopentyl glycol, 1,3-butanediol, hexanediols, 2-methyl-2,4-pentanediol, cyclohexane-1,4-dimethanol, 1,12-dodecanediol, diethylene glycol, and mixtures thereof. Mixtures of the various suitable polyester polyols are also suitable for use in the present invention. The preferred polyester polyols are 1,6 hexanediol adipate; 1,6 hexanediol neopentyl glycol adipate; neopentyl glycol adipate and mixtures thereof. The polyester polyol(s) preferably has Mw of 250 or greater; more preferably 300 or greater, even more preferably 400 or greater, and most preferably 500 or greater. Also, the polyester polyol(s) preferably has Mw of 8,000 or less; preferably 6,000 or less, even more preferably 5,000 or less, and most preferably 4,000 or less.

Polyether polyols suitable for use in the present invention include polyoxy-$C_2$–$C_6$-alkylene polyols, including branched and unbranched alkylene groups. Examples of suitable polyether polyols include, for example, polyethylene glycol, polypropylene glycol, polytetramethylene glycol or random or block copolymers of these polyethers, and mixtures thereof. Mixtures of the various suitable polyether polyols are also suitable for use in the present invention. The preferred polyether polyols are polypropylene glycols, also known as polypropyleneoxides. The polyether polyol(s) preferably has Mw of 800 or greater; more preferably 900 or greater. Also, the polyether polyol(s) preferably has Mw of 8,000 or less; more preferably 4,000 or less.

In some embodiments of the present invention, the components include at least one fatty polyol. "Fatty" means herein any compound that contains one or more residues of fatty acids. Fatty acids are described, for example, by R. A. Burns in *Fundamentals of Chemistry*, Third Edition (Prentice Hall, 1999). Fatty acids are long-chain carboxylic acids, with chain length of at least 4 carbon atoms. Typical fatty acids have chain length of 4 to 18 carbon atoms, though some have longer chains. Linear, branched, or cyclic aliphatic groups may be attached to the long chain. Fatty acid residues may be saturated or unsaturated, and they may contain functional groups. Suitable fatty polyols include, for example, fatty acids, esters of fatty acids, amides of fatty acids, dimers, trimers, oligomers, or polymers thereof, and mixtures thereof, as long as the compound is a polyol. The hydroxyl functions of a suitable fatty polyol may reside on the fatty acid residue, on other parts of the molecule, or on both.

In embodiments of the present invention in which fatty polyols are used, some preferred fatty polyols are castor oil, the products of hydroxylation of unsaturated or polyunsaturated natural oils, the products of hydrogenations of unsaturated or polyunsaturated polyhydroxyl natural oils, polyhydroxyl esters of alkyl hydroxy fatty acids, polymerized natural oils, and alkylhydroxylated amides of fatty acids. More preferred are castor oil, hydroxylated soybean oil, hydrogenated castor oil, polymerized castor oil, hydroxy ethyl ricinoleate, and hydroxy ethyl ricinoleamide. Most preferred is castor oil.

In the practice of the present invention, the preferred polyols are polyether polyols, polyester polyols, fatty polyols, and mixtures thereof. More preferred is a mixture that contains at least one polyether polyol and at least one polyester polyol. When polyether polyol(s) and polyester polyol(s) are both used, the preferred weight % of all polyether polyols, based on the weight of all polyols, is 5% or greater; more preferred is 10% or greater, even more preferred is 15% or greater, and most preferred is 20% or greater. Also, when polyether polyol(s) and polyester polyol(s) are both used, the preferred weight % of all polyether polyols, based on the weight of all polyols, is 90% or less; more preferred is 50% or less; even more preferred is 30% or less.

The moisture-reactive hot-melt composition of the present invention is formed by admixing components which include at least one silane-functional polyolefin. Polyolefins are well known in the art and described, for example, by K. J. Saunders in *Organic Polymer Chemistry*, Chapman and Hall, London, 1973. Polyolefins are generally polymers of unsaturated hydrocarbon monomers. Examples of polyolefins include polymers and copolymers of ethylene, propylene, isobutene, 1-butene, 4-methyl-1-pentene, isoprene, butadiene, other unsaturated alkenes, and mixtures thereof. Polyolefins also include such hydrocarbon polymers that have added functional groups, such as, for example, chlorinated polyolefins and chlorosulfonated polyolefins. Preferred are polymers and copolymers of hydrocarbon monomers with one double bond per monomer molecule, such as, for example, polymers and copolymers of ethylene, propylene, 1-butene, 4-methyl-1-pentene, other α-unsaturated alkenes with 4–10 carbon atoms, and mixtures thereof.

Some polyolefins preferred for use as the polymer backbone in silane-functional polyolefins of the present invention are poly-α-olefins, which are defined herein as polymers whose polymerized units include at least 90% by weight α-olefins (i.e., monoethylenically unsaturated hydrocarbons with the double bond in the α position). Some suitable polyolefins include, for example, polypropylene, poly-1-butene, and copolymers of the following composition:
 (a) 0–95% by weight, based on the weight of monomers (a), (b), and (c), at least one α-unsaturated olefin having 4–10 carbon atoms,
 (b) 5–100% by weight, based on the weight of monomers (a), (b), and (c), propylene, and
 (c) 0–20% by weight, based on the weight of monomers (a), (b), and (c), ethylene. Polyolefins may be crystalline, partially crystalline, or amorphous. Preferred are largely amorphous polyolefins, i.e., those with 20% or less crystallinity. Percent crystallinity of a polymer is determined by measurements performed on a pure or reasonably pure sample of the polymer, after annealing, as described by L. E. Sperling in *Introduction to Physical Polymer Science,* second edition, John Wiley & Sons, Inc., 1992. One suitable method of determining percent crystallinity of polymers is an X-ray diffraction method known as Ruland's procedure, which is described for example by L. E. Alexander in *X-Ray Diffraction Methods in Polymer Science,* Krieger Publishing Co., Malabar, Fla., 1969. Some preferred polyolefins are atactic polypropylene, atactic poly-1-butene, amorphous copolymers of monomers (a), (b), and (c) above, and mixtures thereof.

Silane-functional polyolefins are polyolefins that have silane pendant groups attached to the main polymer chain. As used herein, a silane pendant group is a group that contains at least one silicon atom with at least one alkoxy group attached to the silicon atom. Preferred are pendant groups with three alkoxy groups attached to the silicon atom. When more than one alkoxy group is attached to a silicon atom, the alkoxy groups may be the same or different. Preferred alkoxy groups are methoxy, ethoxy, butoxy, methoxyethoxy, and mixtures thereof; more preferred are methoxy, ethoxy, and mixtures thereof; most preferred is methoxy. The silicon atom may be attached to the polymer chain directly or through an organic group. The organic group linking the silicon atom to the polymer chain may contain, for example, hydrocarbon portions, ester linkages, ether linkages, other heteroatom linkages, and combinations thereof. As used herein, the silane pendant group includes the organic group, if any, that attaches the silicon atom to the polyolefin polymer chain.

The silane-functional polyolefin may be made by any method. For example, the pendant group may be attached to monomers before the polymerization of the polyolefin; it may be attached to the polymer after polymerization, or it may be attached during some intermediate stage. Additionally, a pendant group may be attached to the monomer or polymer and then chemically modified to create a suitable pendant group. One suitable method of making silane-grafted polyolefins is disclosed in U.S. Pat. No. 5,994,474, in which polyolefins are silane-grafted by melt-blending the polyolefin with a free-radical donor and silane molecules that have trialkoxysilane groups attached to ethylenically unsaturated organic portions. Suitable silane molecules for grafting onto polyolefins are for example vinyltrimethoxysilane, vinyltriethoxysilane, vinyl tris(2-methoxyethoxy) silane, 3-methacryloxypropyltriethoxysilane, vinyl dimethylmethoxysilane, vinylmethyldibutoxysilane, and mixtures thereof.

Silane-functional polyolefins of the present invention may be crystalline, partially crystalline, or amorphous. Preferred are largely amorphous silane-functional polyolefins, i.e., those with 20% or less crystallinity; more preferred is 10% or less crystallinity; even more preferred is 5% or less crystallinity. Some preferred silane-functional polyolefins are silane-functional atactic polypropylene, silane-functional atactic poly-1-butene, silane-functional amorphous copolymers of monomers (a), (b), and (c) above, and mixtures thereof.

The silane-functional polyolefins of the present invention may contain a variety of amounts of silane pendant groups. A preferred amount of silane pendant groups is 0.1% or more by weight based on the weight of the silane-functional polyolefin; more preferred is 0.5% or more. Also preferred are amounts of silane pendant groups of 10% or less by weight based on the weight of the silane-functional polyolefin; more preferred is 5% or less.

The silane-functional polyolefins of the present invention preferably have Mn of 2,000 or greater; more preferably 5,000 or greater; and even more preferably 9,000 or greater. Also, the silane-functional polyolefins of the present invention preferably have Mn of 100,000 or less; more preferably 50,000 or less; still more preferably of 20,000 or less, and most preferably 15,000 or less.

One silane-functional polyolefin known to be suitable in the practice of the present invention is Vestoplast™ 206, available from Degussa-Hüls AG, Marl, Germany, believed to be an amorphous silane-modified poly-α-olefin with Mn of approximately 10,600.

In some embodiments of the present invention, silane-functional polyolefin is preferably present in amounts of 1% or more by weight based on the weight of the hot-melt composition; more preferred is 2% or more; even more preferred is 5% or more; most preferred is 8% or more. Also preferred are amounts of silane-functional polyolefin of 90% or less by weight based on the weight of the hot-melt composition; more preferred is 60% or less; even more preferred is 40% or less; still more preferred is 30% or less; most preferred is 20% or less.

A useful method of characterizing the hot-melt composition of the present invention is the free NCO content. The free NCO content is the weight percent, based on the total weight of the hot-melt composition, of free NCO. Free NCO is the amount of NCO in excess of the amount needed to match the reactive H atoms present in the admixture on a 1:1 basis. Reactive H atoms are those believed to be likely to react fully or nearly fully with the NCO groups. Included in the reactive H atoms are those in hydroxyl groups and those in carboxyl groups. In the practice of the present invention, suitable admixtures have free NCO content of 0.1% or more; preferably 0.2% or more; more preferably 0.5% or more; and even more preferably 1% or more. Also, admixtures preferably have free NCO content of 10% or less; more preferably 8% or less; even more preferably 5% or less.

Another useful method of characterizing the hot-melt composition of the present invention is the ratio of NCO/OH groups from all of the admixed components taken on an equivalents basis. Preferred are hot-melt compositions with NCO/OH ratio of 1.3 or higher. Also preferred are hot-melt compositions with NCO/OH ratio of 5 or lower.

Various reactive groups that provide moisture reactivity are known in the art. One type is the isocyanate group. Two isocyanate groups attached to polymer chains can react with water to form a urea-type linkage, which becomes a crosslink between those two polymer chains. Another type is the silane group. Two silane groups attached to polymer chains can react with water to form a Si—O—Si bond which becomes a crosslink between those two polymer chains. While the present invention is not limited to a specific mechanism of cure, it is believed that both isocyanate and silane reactive groups are present in the present invention. Other types of moisture-reactive groups are known, and they may or may not be present in the present invention.

The components of the present invention preferably contain less than 1% water by weight based on the total weight of the components; more preferably less than 0.2% water; and even more preferably less than 0.1% water.

The components may be mixed by conventional or other means, preferably in an inert, dry atmosphere. The components may be mixed together all at one time (in a "one stage" process); alternatively, some components and/or portions of components may be mixed together in one operation (or "stage"), with other components and/or portions of components added in additional stage or stages. Normally, the components are heated above room temperature. The components may be heated before, during, or after the process of mixing. If more than one stage of addition of components and/or mixing and/or heating is used, the mixture of one stage may be heated for a time before the next stage is added. Preferred temperature of heating is 50° C. to 130° C. If more than one stage is used, the temperature of each stage may be chosen independently. During any of the mixing and/or heating stages, full or partial vacuum may be applied; also nitrogen gas or other dry and/or inert gas may be used to blanket the surface of the admixture.

If any material that is to be added to the reaction mixture is a solid, it is preferably solubilized by heating and mixing with at least one of the non-isocyanate containing components before being admixed with the polyisocyanate. In addition, a catalyst such as, for example, a tertiary amine or a tin-based catalyst may optionally be admixed with the components. Such catalysts, if used, are believed to accelerate the reaction between polyols and polyisocyanates, as taught by K. Uhlig in *Discovering Polyurethanes*, Hanser Publishers, 1999. Such catalysts, if used, may be added to the components either before, during, or after any one or more of the stages of mixing the components. When such an optional catalyst is used, the usual use level is 1% or less by weight based on the total weight of the admixed components; preferably 0.5% or less; more preferably 0.25% or less; and most preferably 0.1% or less. The adhesive composition of this invention, which is a moisture-reactive composition, may be stored, preferably under an inert, dry atmosphere, until use.

The hot-melt composition of the present invention may be formulated by admixing additional conventional ingredients such as, for example, thermoplastic materials, adhesion promoters, fillers, pigments, plasticizers, rheology modifiers, etc., with due regard to the reactivity of the moisture-reactive groups, which is desirably maintained.

Some additional conventional ingredients which are suitable for use in the present invention are a variety of thermoplastic (i.e., non-curing) materials such as for example tackifiers, waxes, and polymers and/or resins. Some suitable thermoplastic materials and their uses with moisture-curable polyurethanes are disclosed in U.S. Pat. No. 3,391,077, U.S. Pat. No. 4,775,719, and U.S. Pat. No. 6,303,731. Preferred embodiments of the present invention are made without tackifier. Also preferred are embodiments without waxes. Additionally, embodiments without thermoplastic resins and/or polymers are preferred.

Some other additional conventional ingredients which are suitable for use in the present invention are silane adhesion promoters. Silane adhesion promoters are either monomeric or oligomeric. Each molecule of a monomeric silane adhesion promoter has a single silicon atom with four non-polymeric groups attached to it. Some suitable non-polymeric groups are vinyl, alkyl, alkoxy, phenyl, aminoalkyl, acryloxyalkyl, methacryloxyalkyl, substituted versions thereof, and mixtures thereof. Oligomeric silane adhesion promoters have the structure of reaction products of a few (usually 2–10) monomeric silane adhesion promoter molecules. Oligomeric silane adhesion promoters generally have molecular weight less than 2,000. The use of silane adhesion promoters with moisture-curable polyurethanes has been described in U.S. Pat. Nos. 6,303,731 and 6,280,561. While these monomeric and/or oligomeric silane adhesion promoters are suitable as ingredients in the present invention, they are distinct from the silane-functional polyolefins described above.

In preferred embodiments of the present invention, the components are compatible. That is, the components preferably are capable of being admixed so that the moisture-reactive hot-melt composition of the present invention is homogeneous, which means that no layers or other signs of separation in the composition are visible. The compatibility of the components may be achieved by selection of compatible materials or by addition of a compatibilizing ingredient. While not limiting the invention to any specific mechanism, the presence of a silane adhesion promoter is believed to act as a compatibilizing ingredient. Preferred embodiments of the present invention contain at least one silane adhesion promoter.

When a silane adhesion promoter is used in the practice of the present invention, preferred silane adhesion promoters have at least one methoxy group. Also preferred are silane adhesion promoters with at least one carbon-carbon double bond. One group of preferred silane adhesion promoters have the structure $SiR^1R^2R^3R^4$, where $R^1, R^2, R^3$, and $R^4$ are each bonded directly to the Si atom; $R^1$ is a monoethylenically unsaturated hydrocarbon group; $R^2$ is an alkyl or alkoxy group; and $R^3$ and $R^4$ are alkoxy groups that may be the same or different from each other and from $R^2$. Within this group, more preferred are vinyl trimethoxy silane, vinyl triethoxy silane, and vinyl methyl dimethoxy silane. Most preferred is vinyl trimethoxy silane, available as Silquest™ A-171, from OSI Specialties. When a silane adhesion promoter is used, a preferred amount is 0.01% or more by weight based on the weight of all components; more preferred is 0.05% or more; even more preferred is 0.1% or more; most preferred is 0.15% or more. When a silane adhesion promoter is used, also preferred are amounts 5% or less by weight based on the weight of all components; more preferred is 2% or less; even more preferred is 1% or less.

In some embodiments of the present invention, the moisture-reactive hot-melt composition is a one-pack system. That is, if desired, the components may all be admixed and then stored in an inert, dry atmosphere, until it is desired to be melted and applied to a substrate. The one-pack characteristic of the present invention gives it a difference from 2-pack systems, in addition to any differences in composition between the present invention and any such 2-pack systems. One example of a 2-pack system is disclosed in WO 01/72922.

In the method of the present invention for bonding substrates, the moisture-reactive hot-melt composition is heated in order to achieve a viscosity suitable for transporting the adhesive, such as by pumping or gravity feed, to the application equipment and for the application of the adhesive to a first substrate in the presence of moisture. The temperature should be high enough to achieve a suitable viscosity but low enough to avoid excessive degradation or other undesirable effects on the adhesive. Typical useful temperatures are 40° C. or higher; preferably 75° C. or higher; and more preferably 100° C. or higher. Also typical are temperatures of 160° C. or less; preferred are 150° C. or less; and more preferred are 140° C. or less.

The application of the adhesive may be effected by conventional means such as, for example, heated spray applicator, heated bead applicator, heated nozzle, and heated roll coater, to form a continuous or discontinuous film of adhesive, as desired. The adhesive may also be applied to the substrate by hand, for example with a hand-held tool such as for example a spatula or other applicator. The adhesive may typically be applied at a level of 50 to 250 g/m² (4–20 g/ft²) although in cases where one of the substrates is a fabric it may be applied at a level as low as 1–50 g/m².

Then, the applied adhesive is contacted by a second substrate to provide a composite construction. Preferably, the adhesive is contacted by the second substrate while the adhesive has a temperature substantially above room temperature. The composite construction so formed is optionally subjected to applied pressure such as by passing it between rollers to effect increased contact of the substrates with the adhesive, and the composite construction is then cooled or allowed to cool. In another embodiment the adhesive may be simultaneously or sequentially applied to two surfaces of the first substrate, which adhesive-coated surfaces are then simultaneously or sequentially bonded to two further substrates, which may be the same or different. It is further contemplated that the composite construction may subsequently be bonded to other substrate(s) using the same or a different adhesive before or after the process described herein. The substrates to be bonded in the method of the present invention may be the same or different and include, for example, metal, wood, consolidated wood products, paper, elastomers, woven and nonwoven fabrics, and plastics which may have smooth or structured surfaces and are provided in the form of rolls, sheets, films, foils, extruded profile, etc. The substrates to be bonded in the method of the present invention include, for example, lauan mahogany plywood, impregnated paper, extruded polystyrene foam, expanded polystyrene foam, fiberglass reinforced polyester, polyester fabric, high or low pressure laminate, plywood, aluminum, steel, acrylic polymers, polyvinyl chloride, synthetic rubber, polymer blends, polyolefins such as for example polyethylene and polypropylene, and engineering plastics.

It is contemplated that the moisture, i.e., water, which is anticipated to effect reaction with the moisture-reactive groups thereby increasing the ultimate cohesive strength of the applied adhesive, may be exposed to the moisture-reactive hot-melt composition of the present invention in any of a variety of ways known in the art. For example, after the hot-melt composition is applied to one substrate but before it is contacted with a second substrate, the hot-melt composition may be exposed to moisture in a variety of ways, including for example ambient humidity, artificially increased or controlled humidified air, a mist of water droplets, a spray of liquid water contacting the applied adhesive, or combinations thereof. Alternatively or additionally, after a second substrate is contacted with the hot-melt composition, the composite structure of substrates and hot-melt composition may be exposed to moisture in any or all of the above ways. The method of exposing the composite structure to moisture is especially useful when one or more of the substrates is a material that is permeable to water vapor, such as for example wood, paper, or textile.

It is further contemplated that the moisture may be augmented by other ingredients that participate, catalyze, or otherwise facilitate the moisture cure reaction or reactions. Such an ingredient or ingredients may be combined with the moisture during any or all or the curing process. Examples of such ingredients are certain amines, which are known to link NCO functional groups together through formation of biuret linkages. Also, some catalysts are known to enhance reactions of NCO functional groups with water to link to each other, and some catalysts are known to enhance reactions of silane functional groups with water to link to each other. Regardless of mechanism, the use of such ingredients to augment the moisture cure reaction or reactions is contemplated in the present invention.

In some embodiments of the present invention, the substrates that are bonded are relatively thin and flat, and in such cases the composite article is called a laminate or laminated structure.

EXAMPLES

Example 1

A reaction vessel was set up with, a gas inlet tube, thermometer, stirrer, vacuum, and a heating jacket. Polyols were preheated overnight at 75–85° C. to facilitate handling. 1307 g. hexanediol adipate (Rucoflex S105P110 with a hydroxyl no.=112.2; M.W.~1000, RUCO Polymer, New York, N.Y.), 1805 g. polyether polyol (PPG 1025; M.W.=1000, PPG Ind., Pittsburgh, Pa.), 1003 g. Vestoplast™ 206(silane modified amorphous poly alpha-olefin from Degussa-Hüls, Marl, Germany) and 3 g. Irganox 245 (antioxidant, Ciba-Geigy Corp., New York, N.Y.) were added to the reaction vessel and the temperature raised to 105° C. with stirring. After 30 minutes at 105° C. and a vacuum of 20 mm of mercury, the temperature was lowered to 90° C. 544 g of a 98/2 mixture of 4,4'-MDI and 2,4'-MDI (BASF Corp., Mt. Olive, N.J.) was added and the temperature was held at 100–105° C. for one hour with stirring and under nitrogen. 4285 g hexanediol adipate (Rucoflex S105P30 with a hydroxyl no.=29.5; M.W.~3803, RUCO Polymer, New York, N.Y.) and 16 g Silquest A-171 (vinyl trimethoxysilane, OSI Specialties, Div. of Witco Corp., New York, N.Y.) was added and the reaction temperature raised to 103–105° C.; vacuum of 20 mm of mercury was applied for 30 minutes and the temperature allowed to fall to 90° C. 1030 g. of a 98/2 mixture of 4,4'-MDI and 2,4'-MDI was added; an exotherm was observed and the reaction temperature was held at 100–105° C. under nitrogen for one hour. During the last 40 minutes, stirring speed was reduced and 200–300 mm Hg vacuum was applied. After a one hour hold 1 g benzoyl chloride and 6 g Jeffcat DMDEE (amine-based catalyst, Huntsman Co.) were added. Mixing continued for an additional 30–40 minutes under nitrogen. At this time the reaction product was poured into a container which was then blanketed in dry nitrogen and sealed.

Example 2

A reaction vessel was set up with, a gas inlet tube, thermometer, stirrer, vacuum, and a heating jacket. Polyols were preheated overnight at 75–85° C. to facilitate handling. 1189 g hexanediol adipate (Rucoflex S105P110 with a hydroxyl no.=109; M.W.~1000), 1642 g polyether polyol (PPG 1025; M.W.=1000), 1824 g Vestoplast™ 206(silane modified amorphous poly alpha-olefin from Degussa) and 3 g Irganox 245 were added to the reaction vessel and the temperature raised to 105° C. with stirring. After 30 minutes at 105° C. and a vacuum of 20 mm of mercury, the temperature was lowered to 90° C. 489 g of a 98/02 mixture of 4,4'-MDI and 2,4'-MDI (BASF Corp., Mt. Olive, N.J.) was added and the temperature was held at 100–105° C. for one hour with stirring and under nitrogen. 3897 g hexanediol adipate (Rucoflex S105P30 with a hydroxyl no.=29.5; M.W.~3803) and 19 g Silquest A-171 was added and the reaction temperature raised to 103–105° C.; vacuum of 20 mm of mercury was applied for 30 minutes and the temperature allowed to fall to 90° C. 931 g of a 98/02 mixture of 4,4'-MDI and 2,4'-MDI was added; an exotherm was observed and the reaction temperature was held at 100–105° C. under nitrogen for one hour. During the last 40 minutes, stirring speed was reduced and 200–300 mm Hg vacuum was applied. After a one hour hold 1 g benzoyl chloride and 5 g Jeffcat DMDEE were added. Mixing continued for an additional 30–40 minutes under nitrogen. At this time the reaction product was poured into a container which was then blanketed in dry nitrogen and sealed.

Example 3

The reactive hot melt adhesives of Examples 1 and 2 are applied to polyolefin substrates. The cure takes place desirably quickly, and the adhesive strength after curing is found to be desirably high, when tested at 25° C. and at 50° C.

I claim:

1. A moisture-reactive hot-melt composition formed by admixing components comprising at least one polyol, at least one polyisocyanate, and at least one silane-functional polyolefin, wherein said silane-functional polyolefin has silane pendant groups in the amount of 10% or less by weight based on the weight of said silane-functional polyolefin.

2. The composition of claim 1, wherein said silane-functional polyolefin has 20% crystallinity or less.

3. The composition of claim 1, wherein said silane-functional polyolefin comprises at least one silane-functional poly-α-olefin.

4. The composition of claim 1, wherein said composition further comprises at least one silane adhesion promoter.

5. The composition of claim 1, wherein said silane-functional polyolefin comprises at least one silane-functional poly-α-olefin, wherein said silane-functional polyolefin has 20% or less crystallinity, and wherein said composition further comprises at least one silane adhesion promoter.

6. A bonded composite article comprising at least two substrates bonded by a moisture-reactive hot-melt composition formed by admixing components comprising at least one polyol, at least one polyisocyanate, and at least one silane-functional polyolefin; wherein said silane-functional polyolefin comprises at least one silane-functional poly-α-olefin; wherein said silane-functional polyolefin has 20% or less crystallinity; and wherein said hot-melt composition further comprises at least one silane adhesion promoter, and wherein said silane-functional polyolefin has silane pendant groups in the amount of 10% or less by weight based on the weight of said silane-functional polyolefin.

* * * * *

UNITED STATES PATENT AND TRADEMARK OFFICE
CERTIFICATE OF CORRECTION

PATENT NO. : 6,867,226 B2
APPLICATION NO. : 10/219496
DATED : March 15, 2005
INVENTOR(S) : Yasuo Sato et al.

It is certified that error appears in the above-identified patent and that said Letters Patent is hereby corrected as shown below:

(73) Assignee: Meiji Seika Kaisha, Ltd.; Koichi Shudo, both of Tokyo, Japan

Signed and Sealed this

Eighth Day of August, 2006

JON W. DUDAS
*Director of the United States Patent and Trademark Office*